(12) United States Patent
Yamashita et al.

(10) Patent No.: US 7,327,484 B2
(45) Date of Patent: Feb. 5, 2008

(54) DATA PROCESSING APPARATUS FOR IMPARTING PRIORITY TO EITHER NULLIFICATION OF PROCESSED DATA OR PROCESSING OF NON-PROCESSED DATA

(75) Inventors: Michihiro Yamashita, Nara (JP); Norichika Katsura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 251 days.

(21) Appl. No.: 11/080,828

(22) Filed: Mar. 11, 2005

(65) Prior Publication Data

US 2005/0219611 A1    Oct. 6, 2005

(30) Foreign Application Priority Data

Mar. 19, 2004  (JP)  ............................. 2004-081297
Apr. 21, 2004  (JP)  ............................. 2004-125981

(51) Int. Cl.
    *G06F 12/14*    (2006.01)
(52) U.S. Cl. ...................... 358/1.15; 358/1.14; 399/82
(58) Field of Classification Search ...... 358/1.13–1.15, 358/403, 434–439; 399/82
    See application file for complete search history.

(56) References Cited

U.S. PATENT DOCUMENTS

| | | | | |
|---|---|---|---|---|
| 6,731,447 | B2 * | 5/2004 | Bunker et al. ................. | 360/60 |
| 2002/0075501 | A1 * | 6/2002 | Mantell et al. ............ | 358/1.14 |
| 2002/0171867 | A1 * | 11/2002 | Nobuhara et al. ......... | 358/1.15 |
| 2003/0035139 | A1 * | 2/2003 | Tomita et al. ............. | 358/1.15 |
| 2005/0162691 | A1 * | 7/2005 | Tsuzuki ..................... | 358/1.15 |
| 2006/0244997 | A1 * | 11/2006 | Watabe ...................... | 358/1.16 |

FOREIGN PATENT DOCUMENTS

| JP | 09223061 | A | * | 8/1997 |
|---|---|---|---|---|
| JP | 09-284572 | | | 10/1997 |
| JP | 2001-063157 | | | 3/2001 |
| JP | 2004-072138 | | | 3/2004 |

OTHER PUBLICATIONS

Machine translation of JP 09223061 A.*
Machine translation of JP 09223061 A (Aug. 1997).*

* cited by examiner

*Primary Examiner*—King Y. Poon
*Assistant Examiner*—Nathan K Tyler
(74) *Attorney, Agent, or Firm*—William J. Daley, Jr.; Edwards Angell Palmer & Dodge, LLP

(57) ABSTRACT

A data processing apparatus receives and stores data, and then performs processing such as the output of the stored data. The data processing apparatus nullifies already-processed data by means of deletion or overwrite. The data processing apparatus displays a reception screen for receiving from a user a priority instruction for either a processing-speed oriented priority where priority is imparted to the processing of data or a security oriented priority where priority is imparted to the nullification of data. When the security oriented priority is instructed, the data processing apparatus performs the nullification of data immediately after the processing of the data. When the processing-speed oriented priority is instructed, the data processing apparatus performs with priority the processing of data. Then, when not-yet-processed data has been completed, or alternatively after a user has left the site, the data processing apparatus performs the nullification of already-processed data.

3 Claims, 13 Drawing Sheets

FIG. 2

| INITIAL SETTING | PRIORITY TO NULLIFICATION |
|---|---|
| TIMES OF OVERWRITE | 3 |
| IMAGE DATA RECEPTION SECTION WHERE CHANGING OF PRIORITY IS NOT PERMITTED | MODEM SECTION |
| IMAGE DATA RECEPTION SECTION WHERE CHANGING OF PRIORITY IS PERMITTED | IMAGE READ SECTION COMMUNICATION SECTION |
| USER ALLOWED TO INPUT PRIORITY INSTRUCTION | OOOOOO<br>xxxxxx<br>xOxxOx<br>OxxOOx<br>⋮ |

FIG. 9

| DATE AND TIME | PROCESSING CONTENTS | IDENTIFICATION INFORMATION | USER RANK | PRIORITY INFORMATION |
|---|---|---|---|---|
| 20.. :** | COPY | XXXXXX | A | PRIORITY TO NULLIFICATION |
| 20.. :** | PRINT | OOOOO | C | PRIORITY TO PROCESSING |
| 20.. :** | FACSIMILE | OOXXO | C | PRIORITY TO PROCESSING |
| ... | ... | ... | ... | ... |

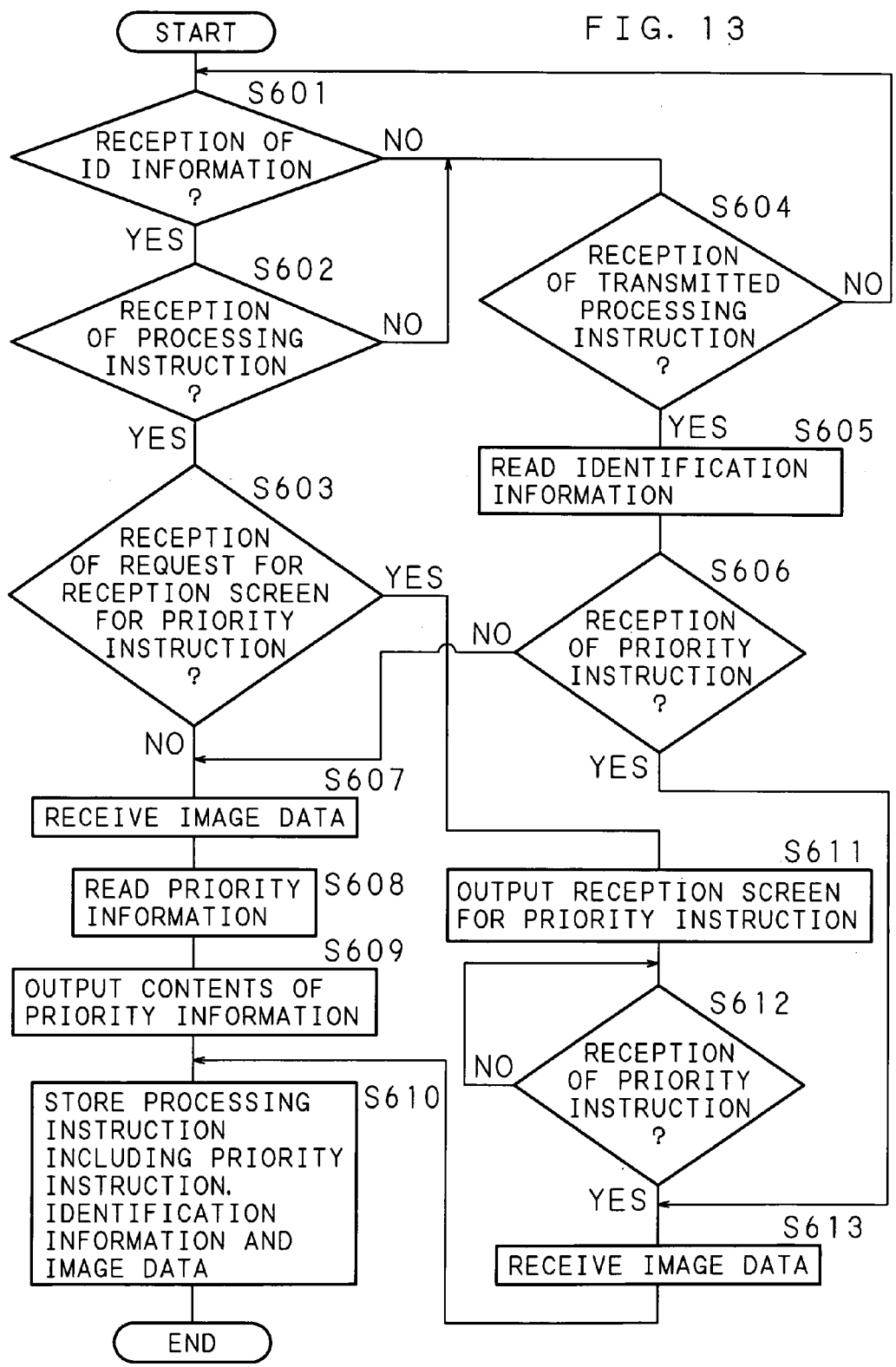

DATA PROCESSING APPARATUS FOR IMPARTING PRIORITY TO EITHER NULLIFICATION OF PROCESSED DATA OR PROCESSING OF NON-PROCESSED DATA

CROSS-REFERENCE TO RELATED APPLICATIONS

This Nonprovisional application claims priority under 35 U.S.C. §119(a) on Patent Applications No. 2004-81297 filed in Japan on Mar. 19, 2004 and No. 2004-125981 filed in Japan on Apr. 21, 2004, the entire contents of which are hereby incorporated by reference.

BACKGROUND OF THE INVENTION

The present invention relates to a data processing apparatus capable of efficiently performing the protection of data and the processing of data.

In image processing apparatuses having a copy function of scanning a manuscript image and thereby copying the image, integration of functions is progressing in recent years. Some of presently available image processing apparatuses have a plurality of functions in addition to the copy function. These additional functions include: the function of a network printer which is connected to a communication network such as a LAN, and which receives image data from an external device such as a personal computer (PC) and then outputs the image; and a facsimile function for transmitting and receiving image data to and from an external facsimile machine by means of facsimile communication. Such an image processing apparatus comprises storing means such as a hard disk or a semiconductor memory for temporarily storing image data to be processed. In the image processing apparatus, the storing means sequentially stores inputted image data, while each piece of the image data stored in the storing means is processed at an appropriate time that the piece of image data should be processed. As such, a large amount of image data is processed efficiently without stagnation.

After being processed by the image processing apparatus, the image data is maintained in a state stored in the storing means until the data is overwritten when the storing means stores new image data. In some cases, in the copying of manuscript images or the outputting of images, image data processed by the image processing apparatus can contain information having confidentiality such as a document describing personal information or trade secrets. When such image data containing confidential information is stored for a long time in the storing means of the image processing apparatus, a risk arises that the image data stored in the storing means could be retrieved in an unauthorized manner so that the information could leak out. Then, a technique is necessary that prevents the image data from being retrieved in the storing means in an unauthorized manner. Japanese Patent Application Laid-Open No. 9-284572 (1997) discloses a technique in which when the processing of image data is completed, the image data stored in storing means is deleted or alternatively overwritten with another data so that the retrieval of the image data is made impossible. As such, an image processing apparatus has been developed that nullifies image data by means of deletion or overwrite and thereby protects image data from unauthorized use.

In such an image processing apparatus that nullifies image data by means of deletion or overwrite, the nullification of image data needs a time proportional to the data size of the image data. Further, during the nullification of image data, the processing of other image data becomes stagnated or even impossible. Thus, in case that image data to be processed is received continuously, the image processing apparatus has the problem of a decrease in the throughput of the image data.

BRIEF SUMMARY OF THE INVENTION

The invention has been devised with considering such a situation. An object of the invention is to provide a data processing apparatus in which the efficiency of data processing is improved with maintaining the capability of protecting the data.

Another object of the invention is to provide a data processing apparatus capable of improving either data protection or data processing efficiency appropriately depending on the operating condition.

A data processing apparatus according to the invention comprises: data receiving means for receiving data; storing means for storing the data received by the data receiving means; processing means for processing the data stored in the storing means; and nullifying means for nullifying the data stored in the storing means. The data processing apparatus further comprises priority instruction receiving means for receiving a priority instruction for imparting priority to either the nullification to be performed by the nullifying means onto data having been processed by the processing means or the processing to be performed by the processing means onto not-yet-processed data. This data processing apparatus for processing data and then nullifying already-processed data can receive a priority instruction for instructing that priority should be imparted to either the processing of data or the nullification of data. As such, in the processing of the data, the priority instruction for instructing that priority should be imparted to either the processing of data or the nullification of data can be received. This allows a user to judge the contents of the data and thereby select priority to the processing of data or the nullification of data. When the confidentiality of the data is high, priority is imparted to the nullification of data to be performed by means of deletion or overwrite. This maintains the security of the information at a high level. On the contrary, when the confidentiality of the data is low, priority is imparted to the processing of data so that the processing efficiency for the data is improved.

In a data processing apparatus according to the invention, the nullifying means deletes the data stored in the storing means. That is, the nullification of data is performed by the deletion of already-processed data.

In a data processing apparatus according to the invention, the nullifying means overwrites with another data the data stored in the storing means. That is, the nullification of data is performed by overwriting already-processed data with another data.

A data processing apparatus according to the invention further comprises means for changing the intensity of the nullification of data to be performed by the nullifying means. That is, the intensity of the nullification of data can be changed. Thus, in a data processing apparatus frequently treating confidential documents, the number of times of overwrite may be increased so that the intensity of nullification may be improved. As such, depending on the operating environment of the data processing apparatus, the level of the security of the information and the convenience of use of the data processing apparatus can be adjusted.

In a data processing apparatus according to the invention, the priority instruction receiving means receives a priority instruction before the start of the processing of data performed by the processing means. As such, since a priority instruction is received before the start of the processing of data, the specification of the priority is ensured appropriately depending on the contents of the data.

A data processing apparatus according to the invention further comprises: means for receiving identification information of a user; and means for determining the permission or non-permission for the priority instruction receiving means to receive a priority instruction, depending on the received identification information. By virtue of this, the user is identified so that the permission or non-permission to receive a priority instruction is determined depending on the user. The changing of the priority to the processing of data or the nullification of data can degrade the security level of the information. Thus, as described here, the permission or non-permission to receive a priority instruction is determined depending on the user so that limited users solely are allowed to input a priority instruction. This avoids excessive degradation in the security level of the information.

A data processing apparatus according to the invention further comprises: means for judging the importance of the data received by the data receiving means; and means for determining the permission or non-permission for the priority instruction receiving means to receive a priority instruction, depending on the judged importance of the data. By virtue of this, the importance of the data is judged so that the permission or non-permission to receive a priority instruction is determined depending on the importance of the data. As such, when the permission or non-permission to receive the priority instruction is determined depending on the importance of the data, excessive degradation in the security level of the information is avoided for the data having high importance.

A data processing apparatus according to the invention comprises plural pieces of data receiving means, and further comprises means for determining the permission or non-permission for the priority instruction receiving means to receive a priority instruction, depending on which data receiving means has received the data. In some cases, the necessity of changing the priority is specified depending on the class of the data receiving means having received the data. Thus, the changing of the priority is made impossible for data receiving means for receiving image data having low necessity of changing the priority. This maintains the security level of the information.

In a data processing apparatus according to the invention, when the priority instruction receiving means receives an instruction for imparting priority to the nullification of data to be performed by the nullifying means, the nullifying means performs the nullification of data at the time that the processing of data to be performed by the processing means has been completed. As such, when priority is imparted to the nullification of data, the nullification of data is performed at the time that the processing of data has been completed. This avoids unauthorized retrieval of the data, and hence improves the security level of the information.

In a data processing apparatus according to the invention, when the priority instruction receiving means receives an instruction for imparting priority to the processing of data to be performed by the processing means, the nullifying means performs the nullification of data in a predetermined timing after the processing of data to be performed by the processing means has been completed. That is, when priority is imparted to the processing of data, the nullification of data is performed in a predetermined timing after the processing of data has been completed.

A data processing apparatus according to the invention further comprises user detecting means for detecting the presence of a user. Then, the nullifying means performs the nullification of data in the timing that the presence of the user having been detected by the user detecting means is no longer detected by the user detecting means. When priority is imparted to the processing of data, the nullification of data is performed when the presence of the user is not detected. This allows the nullification of data to be performed in the timing that the processing of data is unnecessary. This improves the processing efficiency for the data.

A data processing apparatus according to the invention further comprises checking means for checking whether the storing means stores not-yet-processed data to be processed by the processing means. Then, the nullifying means performs the nullification of data in the timing that the checking means has checked that the storing means does not store not-yet-processed data. In case that priority is imparted to the processing of data, the nullification of data is performed when not-yet-processed data is not present. This, the nullification of data is performed in the timing that the processing of data is unnecessary. This improves the processing efficiency for the data.

In a data processing apparatus according to the invention, as an initial setting, it is set up that in case that no priority instruction is received, priority should be imparted to either the nullification of data to be performed by the nullifying means or the processing of data to be performed by the processing means. As such, the priority to the processing of data or the nullification of data is set up as the initial setting. This allows the level of the security of the data processing apparatus to be specified in case that no priority instruction is received.

A data processing apparatus according to the invention comprises: data receiving means for receiving data; storing means for storing the data received by the data receiving means; processing means for processing the data stored in the storing means; and nullifying means for nullifying the data stored in the storing means. The data processing apparatus further comprises: history storing means for storing a usage history; setting means for setting up that priority should be imparted to either the processing to be performed by the processing means onto not-yet-processed data or the nullification to be performed by the nullifying means onto already-processed data, depending on the contents of the usage history stored in the history storing means; and executing means for performing with priority either the processing of not-yet-processed data or the nullification of already-processed data, depending on the setting result of the setting means. This data processing apparatus for processing the data and then nullifying already-processed data stores the usage history, and thereby sets up that priority should be imparted to either the processing of data or the nullification of data, depending on the contents of the stored usage history. This allows the data processing apparatus to achieve appropriate capability depending on the operating environment.

A data processing apparatus according to the invention further comprises means for receiving a priority instruction for imparting priority to either the processing of not-yet-processed data or the nullification of already-processed data. Depending on the received priority instruction, the executing means performs with priority either the processing of not-yet-processed data or the nullification of already-processed data. The history storing means stores, as a usage history, which of the processing of not-yet-processed data and the nullification of already-processed data has been performed with priority in response to the priority instruction. Depending on the result of comparison between the number of times of imparting priority to the nullification of already-processed data and the number of times of imparting priority to the processing of not-yet-processed data which are stored as a usage history, the setting means sets up that priority should be imparted to either the processing of not-yet-processed data or the nullification of already-processed data. The priority instruction for instructing which of the processing of data and the nullification of data should be performed with priority is received so that which of the processing of data and the nullification of data has been performed with priority in response to the priority instruction is stored as the usage history. Then, for example, priority is imparted to the nullification of data when the usage history shows a large number of times of imparting priority to the nullification of data. As such, depending on the result of comparison between the number of times of priority, it is set up that priority should be imparted to either the processing of data or the nullification of data. By virtue of this, the data processing apparatus achieves appropriate capability depending on the environment such as a processing-speed oriented use or a security oriented use.

In a data processing apparatus according to the invention, depending on the throughput of data contained in the usage history, the setting means sets up that priority should be imparted to either the processing of not-yet-processed data or the nullification of already-processed data. As such, depending on the throughput of data contained in the usage history, it is set up that priority should be imparted to either the processing of data or the nullification of data. Thus, for example, in case that there is a high throughput of data so that the processing can stagnate, the imparting of priority to the processing of data is set up as a processing-speed oriented priority so that the processing of data is performed efficiently. On the contrary, when there is a low throughput of data so that the processing could not stagnate even when priority is imparted to the nullification of image data, security oriented priority is adopted. As such, the processing speed and the security level can be traded off with each other depending on the throughput of the data.

A data processing apparatus according to the invention further comprises identification information receiving means for receiving the identification information of one of users classified into a plurality of classes. The history storing means stores as a usage history the identification information received by the identification information receiving means. Depending on the frequency of each class of the identification information stored as the usage history, the setting means sets up that priority should be imparted to either the processing of not-yet-processed data or the nullification of already-processed data. The identification information for identifying the user is stored as a usage history so that priority is imparted, for example, to the nullification of data when many executives are using the apparatus. As such, depending on the frequency of each class of the identification information contained in the usage history, it is set up that priority should be imparted to either the processing of data or the nullification of data. As described here, depending on the contents of the user identification information contained in the usage history, it is set up that priority should be imparted to either the processing of data or the nullification of data. Thus, for example, priority is imparted to the nullification of data when the apparatus is used by many of such users that treat confidential information frequently. As such, the data processing apparatus achieves appropriate capability depending on the class of users.

A data processing apparatus according to the invention further comprises identification information receiving means for receiving the identification information of a user. The history storing means stores a usage history in a manner corresponded to each of the identification information received by the identification information receiving means. Depending on the usage history stored in the history storing means in a manner corresponded to each of the identification information received by the identification information receiving means, the setting means sets up that priority should be imparted to either the processing of not-yet-processed data or the nullification of already-processed data.

That is, the identification information for identifying a user is received so that a usage history is stored in a manner corresponded to each identification information. Then, depending on the usage history of each user, it is set up that priority should be imparted to either the processing of data or the nullification of data. As such, the usage history of each user is stored in a manner corresponded to the identification information of the user so that the set up is performed for each user that priority should be imparted to either the processing of image data or the nullification of image data. This allows each user to finely adjust appropriate operation of the data processing apparatus depending on the environment of the user.

In a data processing apparatus according to the invention, depending on a usage history stored by the history storing means within a predetermined past period, the setting means sets up that priority should be imparted to either the processing of not-yet-processed data or the nullification of already-processed data. For example, depending on the usage history stored within a predetermined past period such as one month after the operation of the data processing apparatus was started, it is set up that priority should be imparted to either the processing of data or the nullification of data. As such, depending on the usage history stored within a predetermined past period, it is set up that priority should be imparted to either the processing of data or the nullification of data. This allows the data processing apparatus to achieve appropriate capability depending on the general operating environment.

A data processing apparatus according to the invention further comprises means for outputting the contents of the setting result set up by the setting means. The setting result of which of the processing of data and the nullification of data has been provided with priority is outputted so as to allow the user to check the result. As such, the setting result of which of the processing of image data and the nullification of image data has been provided with priority is outputted. This allows the user to check the operating environment of the data processing apparatus.

The above and further objects and features of the invention will more fully be apparent from the following detailed description with accompanying drawings.

BRIEF DESCRIPTION OF THE SEVERAL VIEWS OF THE DRAWINGS

FIG. 2 is a conceptual diagram showing an example of the contents of setting information;

FIG. 9 is a conceptual diagram showing an example of the contents of history information;

FIG. 13 is a flow chart showing a procedure of the process performed by the image processing apparatus according to the second embodiment after which of the processing of image data and the nullification of image data should be provided with priority has been set up.

DETAILED DESCRIPTION OF THE INVENTION

Embodiments of the invention are described below in detail with reference to the drawings.

First Embodiment

Figure 1:
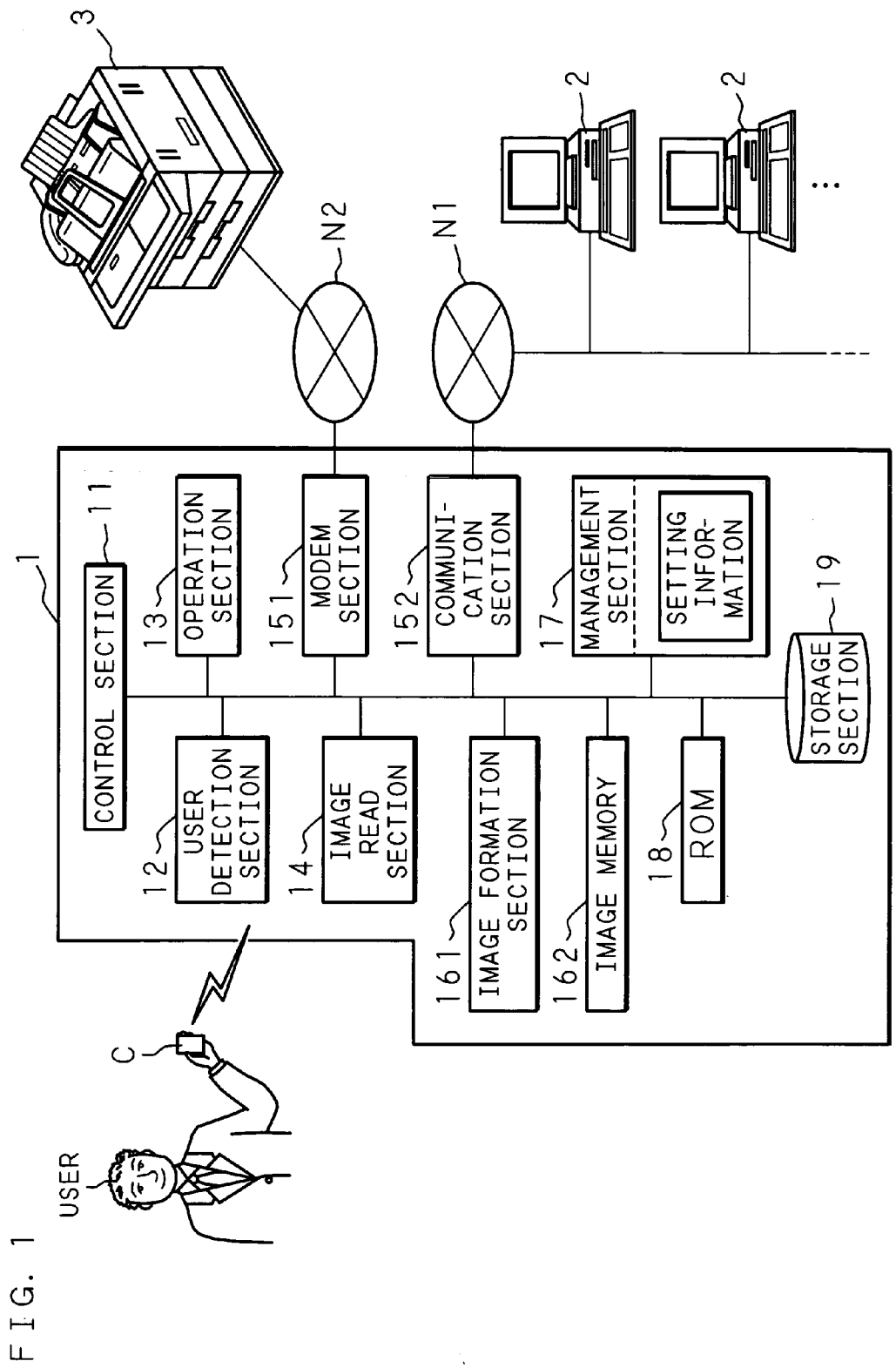
FIG. 1 is a functional block diagram showing the functional configuration of the inside of an image processing apparatus serving as a data processing apparatus according to a first embodiment.

FIG. 1 is a functional block diagram showing the functional configuration of the inside of an image processing apparatus serving as a data processing apparatus according to a first embodiment. An image processing apparatus 1 comprises a control section 11 composed of a CPU for performing arithmetic operations; a RAM for storing temporary information generated in association with the arithmetic operations; and the like. The control section 11 is connected to: a ROM 18 for storing a control program for controlling the image processing apparatus 1; and a management section 17 composed of a memory for storing management information for managing the processing performed by the image processing apparatus 1. The control section 11 is further connected to an image read section 14 for reading an image recorded on recording paper and thereby generating image data. The control section 11 is further connected to a modem section 151 for performing facsimile communication. The modem section 151 is connected to a public network N2. The image processing apparatus 1 can transmit the image data generated by the image read section 14, to another facsimile machine 3 by facsimile communication via the public network N2 connected to the modem section 151. The control section 11 is further connected to: an image memory 162 for storing the image data temporarily; and an image formation section 161 for forming an image from the image data and thereby recording the image onto recording paper. In the image processing apparatus 1, the modem section 151 receives the image data transmitted from another facsimile machine by facsimile communication via the public network N2, while the image memory 162 stores the received image data. Then, the image formation section 161 forms an image from the stored image data. As such, the image processing apparatus 1 serves as a facsimile machine. Alternatively, when the image formation section 161 forms an image read by the image read section 14, the image processing apparatus 1 serves as a copying machine.

Further, the control section 11 is connected to a communication section 152 connected to a communication network N1. The communication network N1 is connected to personal computers (PCs) 2, 2, . . . . The communication section 152 receives image data from the PCs 2, 2, . . . via the communication network N1. The image formation section 161 forms an image from the received image data. As such, the image processing apparatus 1 serves as a printer. The image read section 14, the modem section 151, and the communication section 152 serve as a data reception section according to the first embodiment.

The control section 11 is further connected to a storage section 19 composed of a hard disk, an optical disk, or the like. The storage section 19 stores image data generated by the image read section 14 and image data received by the modem section 151 or the communication section 152. The control section 11 is further connected to an operation section 13 for receiving an operation performed by a user. The operation section 13 comprises: displaying means such as a liquid crystal display panel for displaying information necessary for the operation; and inputting means such as a touch panel and a numeric keypad through which information such as a control instruction is inputted during the operation by the user.

The control section 11 is connected to a user detection section 12 for detecting the presence of a user. Each user carries an ID card C composed of a memory card for storing the identification information of the user. The user detection section 12 can communicate with the ID card C in a non-contact scheme, so as to read the user ID information stored in the ID card C. In the communication between the user detection section 12 and the ID card C, the communication range is limited. That is, the communication between the user detection section 12 and the ID card C requires that the user stays in the vicinity of the image processing apparatus 1. Accordingly, the user detection section 12 can detect the presence of the user on the basis of whether communication is possible with the ID card C or not.

The ROM 18 stores a control program for performing a process for protecting image data from unauthorized use, at the same time as performing the processing of the image data. According to the control program stored in the ROM 18, the control section 11 overwrites with meaningless data and thereby nullifies already-processed image data stored in the storage section 19 after the processing is performed. In case that the process of nullifying the image data is always performed with priority, the security level of the information improves. Nevertheless, the processing efficiency of the image data decreases. Thus, the image processing apparatus 1 according to the first embodiment has a configuration allowing the selection of which of the processing of image data and the nullification of image data should be performed with priority.

The management section 17 stores setting information for recording the setup concerning the selection of the priority to the processing of image data or the nullification of image data. FIG. 2 is a conceptual diagram showing an example of the contents of the setting information. The setting information records the initial setting of which of the processing of image data and the nullification of image data should be provided with priority. In the example of FIG. 2, the initial setting is such that priority is imparted to the nullification of data. In this case, unless an instruction for imparting priority to the processing of image data is received, the image processing apparatus 1 performs with priority the nullification of already-processed data. Since the initial setting is recorded, the level of the security of the image processing apparatus 1 is specified even when no priority instruction is received. The setting information further records the number of times of overwriting the data in the nullification, as the intensity of the nullification of data. When overwrite with another data is performed merely once onto the data stored in the storage section 19, remnant magnetism can allow the restoration of the original data. The nullification of data can be ensured by increasing the number of times of overwrite. The number of times of overwrite can be changed when the user operates the operation section 13 and inputs an instruction for changing the number of times of overwrite. Thus, in an image processing apparatus 1 frequently treating confidential documents, the number of times of overwrite may be increased so that the intensity of nullification may be improved. As such, depending on the operating environment of the image processing apparatus 1, the level of the security of the information and the convenience of use of the image processing apparatus 1 can be adjusted.

Further, in the setting information, a condition is set up that permits the changing of the priority to the processing of image data or the nullification of image data. The setting information records: image data reception sections where the changing of the priority is permitted when the image data is received; and image data reception sections where the changing of the priority is not permitted. In the setting of the example of FIG. 2, when the modem section 151 receives image data, the changing of the priority is not permitted. In contrast, when the image read section 14 or the communication section 152 receives image data, the changing of the priority is permitted. When the modem section 151 receives image data by facsimile communication and performs the processing of the image data, the process is usually carried out in an unattended state. Thus, the necessity for imparting priority to the processing is small. As such, in the case of image data causing small necessity for imparting priority to the processing, the changing of the priority is not permitted. This maintains the security level of the information.

The setting information further stores the identification information of users allowed to input a priority instruction for imparting priority either the processing of image data or the nullification of image data. The identification information recorded in the setting information is information such as the ID information stored in the ID card C carried by each user and the IP address of the PC 2 of each user. A user whose identification information is not recorded in the setting information is not allowed to input a priority instruction to the image processing apparatus 1. The changing of the priority to the processing of image data or the nullification of image data can degrade the security level of the information in the image processing apparatus 1. Thus, limited users solely are allowed to input a priority instruction. This avoids excessive degradation in the security level of the information.

Figure 3:
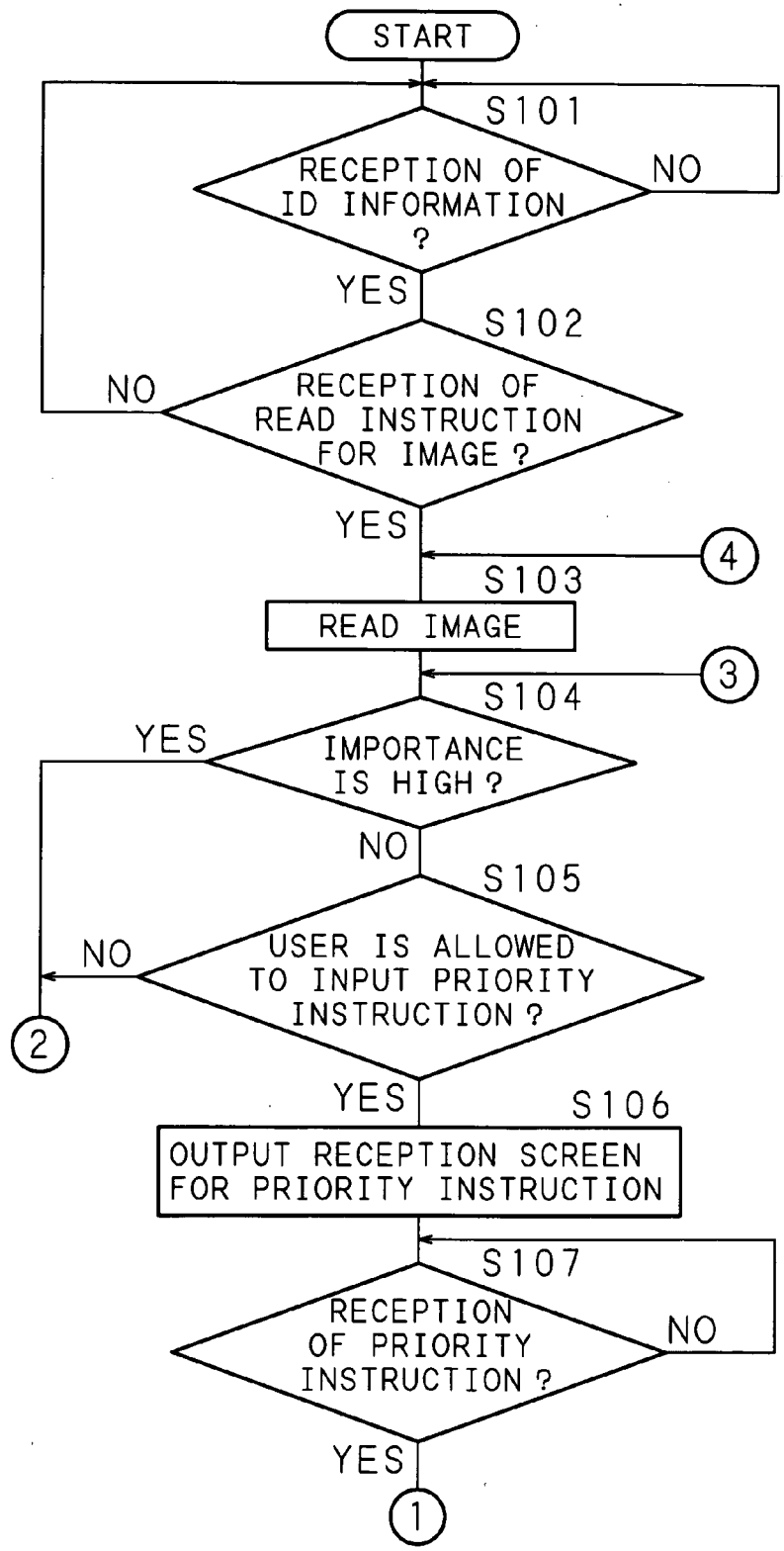
FIG. 3 is a flow chart showing a procedure that the image processing apparatus according to the first embodiment reads an image by means of an image read section, and then performs processing.
Figure 4:
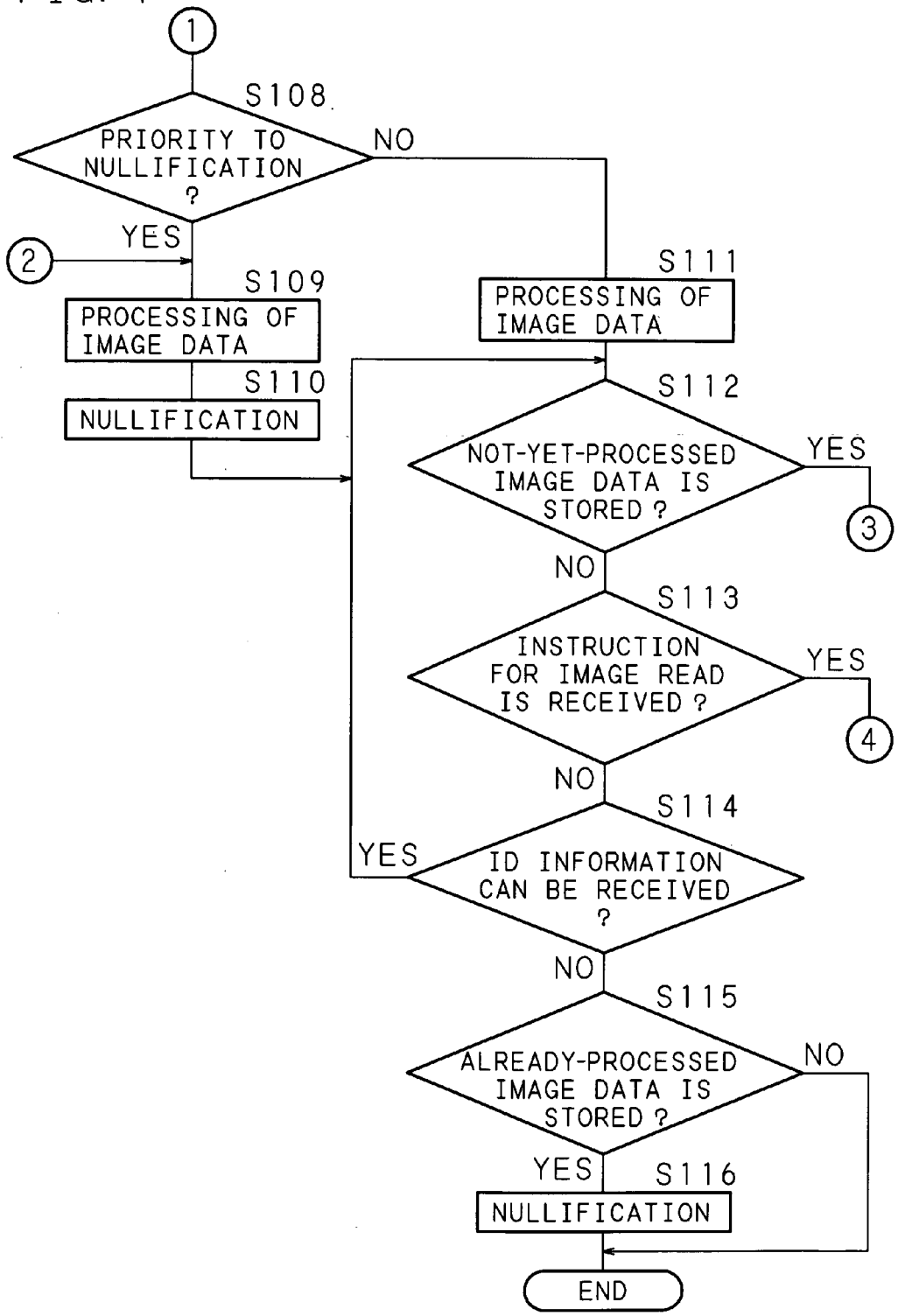
FIG. 4 is a flow chart showing a procedure that the image processing apparatus according to the first embodiment reads an image by means of an image read section, and then performs processing.

Next, the process performed by the image processing apparatus 1 serving as a data processing apparatus according to the first embodiment is described below with reference to flow charts. The following description is made for a process with such initial setting that priority is imparted to the nullification of data. FIG. 3 and FIG. 4 are flow charts showing the procedure that the image processing apparatus 1 reads an image through the image read section 14, and then performs processing. The control section 11 of the image processing apparatus 1 performs the following process according to the control program stored in the ROM 18.

The control section 11 of the image processing apparatus 1 monitors the communication of the user detection section 12 with the ID card C carried by a user staying in the vicinity of the image processing apparatus 1, and thereby monitors that the user detection section 12 receives the ID information stored in the ID card C (S101). When no ID information is received in the user detection section 12 (S101: NO), the control section 11 continues the monitoring of the reception of ID information. When the user detection section 12 receives ID information (S101: YES), the control section 11 monitors the reception of a read instruction for an image issued by the user operating the operation section 13 (S102). At that time, an instruction for the image processing is also received simultaneously that specifies the copying of the read-out image, or the transmission of the image data to another facsimile machine 3 by facsimile communication, or the transmission of the image data to the PC 2, or the like. When no read instruction for an image is received (S102: NO), the control section 11 returns the process to step S101. When a read instruction for an image is received (S102: YES), the control section 11 causes the image read section 14 to read the manuscript image and then store the data into the storage section 19 (S103).

Then, the control section 11 judges whether the importance of the read-out image is high or not (S104). At that time, when a predetermined image such as "top secret" and "important" is contained in the read-out image, the control section 11 judges that the importance of the read-out image is high. When the importance of the read-out image is high (S104: YES), the control section 11 advances the process to step S109 so that priority is imparted to the nullification of already-processed image data. When the importance of the read-out image is not high (S104: NO), the control section 11 judges whether the user indicated by the ID information is allowed to input a priority instruction or not (S105). At that time, the control section 11 refers to the setting information stored in the management section 17. Then, in case that the ID information received by the user detection section 12 is recorded in the setting information as identification information of the users allowed to input priority information, it is judged that the user is allowed to input a priority instruction. When the user is not allowed to input a priority instruction (S105: NO), the control section 11 advances the process to step S109 so that priority is imparted to the nullification of already-processed image data. When the user is allowed to input a priority instruction (S105: YES), the control section 11 outputs a reception screen for the priority instruction for imparting priority either the processing of image data or the nullification of image data, on the displaying means such as a touch panel of the operation section 13 (S106).

Figure 5:
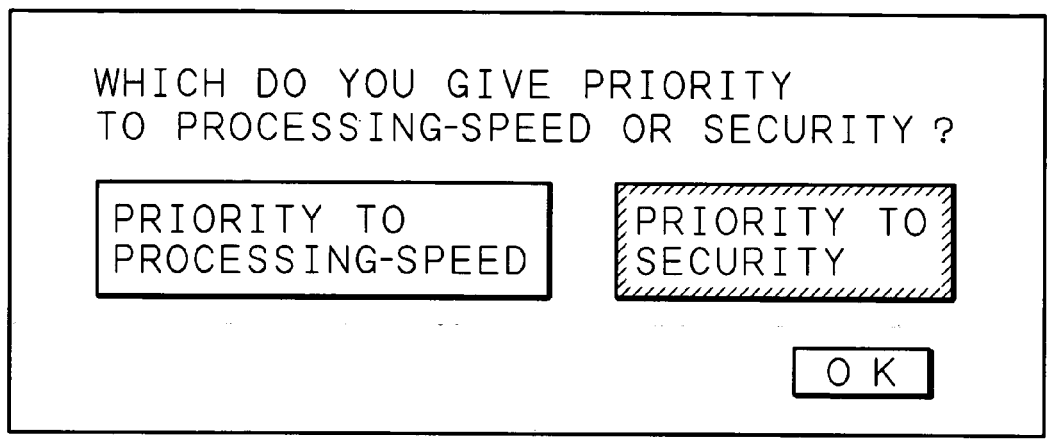
FIG. 5 is a schematic diagram showing an example of a reception screen for a priority instruction.

FIG. 5 is a schematic diagram showing an example of the reception screen for a priority instruction. Each selection button is displayed on the reception screen so as to allow the selection of either a processing-speed oriented priority where priority is imparted to the processing of image data or a security oriented priority where priority is imparted to the nullification of image data. In the initial setting, priority is imparted to the nullification of image data. That is, a security oriented priority is selected in the initial state. In this state, when the user specifies O.K., the imparting of priority to the nullification of image data is instructed. When O.K. is specified after a processing-speed oriented priority is selected in the operation of the user, the imparting of priority to the processing of image data is instructed.

The control section 11 monitors the reception of a priority instruction in the operation section 13 (S107). When no priority instruction is received (S107: NO), the control section 11 continues the monitoring of the reception of a priority instruction. When a priority instruction is received (S107: YES), the control section 11 judges whether the imparting of priority to the nullification of image data is instructed or not (S108). When the imparting of priority to the nullification of image data is instructed (S108: YES), the control section 11 performs the processing of image data, such as the formation of an image in the image formation section 161 on the basis of the image data stored in the storage section 19, the transmission of the image data from the modem section 151 to another facsimile machine 3, and the transmission of the image data from the communication section 152 to the PC 2 (S109). After the processing of image data is completed in step S109, the already-processed image data stored in the storage section 19 is overwritten with meaningless data so that the image data is nullified (S10). Alternatively, the image data may be deleted in the storage section 19 so that the image data may be nullified. Then, the control section 11 advances the process to step S112 described later.

When the imparting of priority to the processing of image data is instructed in step S108 (S108: NO), the control section 11 performs the processing of image data (S111). After step S110 or step S111 is completed, the control section 11 judges whether not-yet-processed image data is stored in the storage section 19 or not (S112). When not-yet-processed image data is stored in the storage section 19 (S112: YES), the control section 11 returns the process to step S104. When not-yet-processed image data is not stored in the storage section 19 (S112: NO), the control section 11 monitors the reception of an image read instruction issued by the user operating the operation section 13 (S113). When an instruction for image read is received (S113: YES), the control section 11 returns the process to step S103. When no instruction for image read is received (S113: NO), the control section 11 judges whether the user detection section 12 can receive the user ID information from the ID card C or not (S114). When the user detection section 12 can receive the ID information (S114: YES), the control section 11 returns the process to step S112.

When the user detection section 12 cannot receive the ID information (S114: NO), the control section 11 judges whether already-processed image data is stored in the storage section 19 or not (S115). When already-processed image data is not stored in the storage section 19 (S115: NO), the control section 11 terminates the process. When already-processed image data is stored in the storage section 19 (S115: YES), the control section 11 performs the nullification of the already-processed image data stored in the storage section 19 (S116), and then terminates the process.

Figure 6:
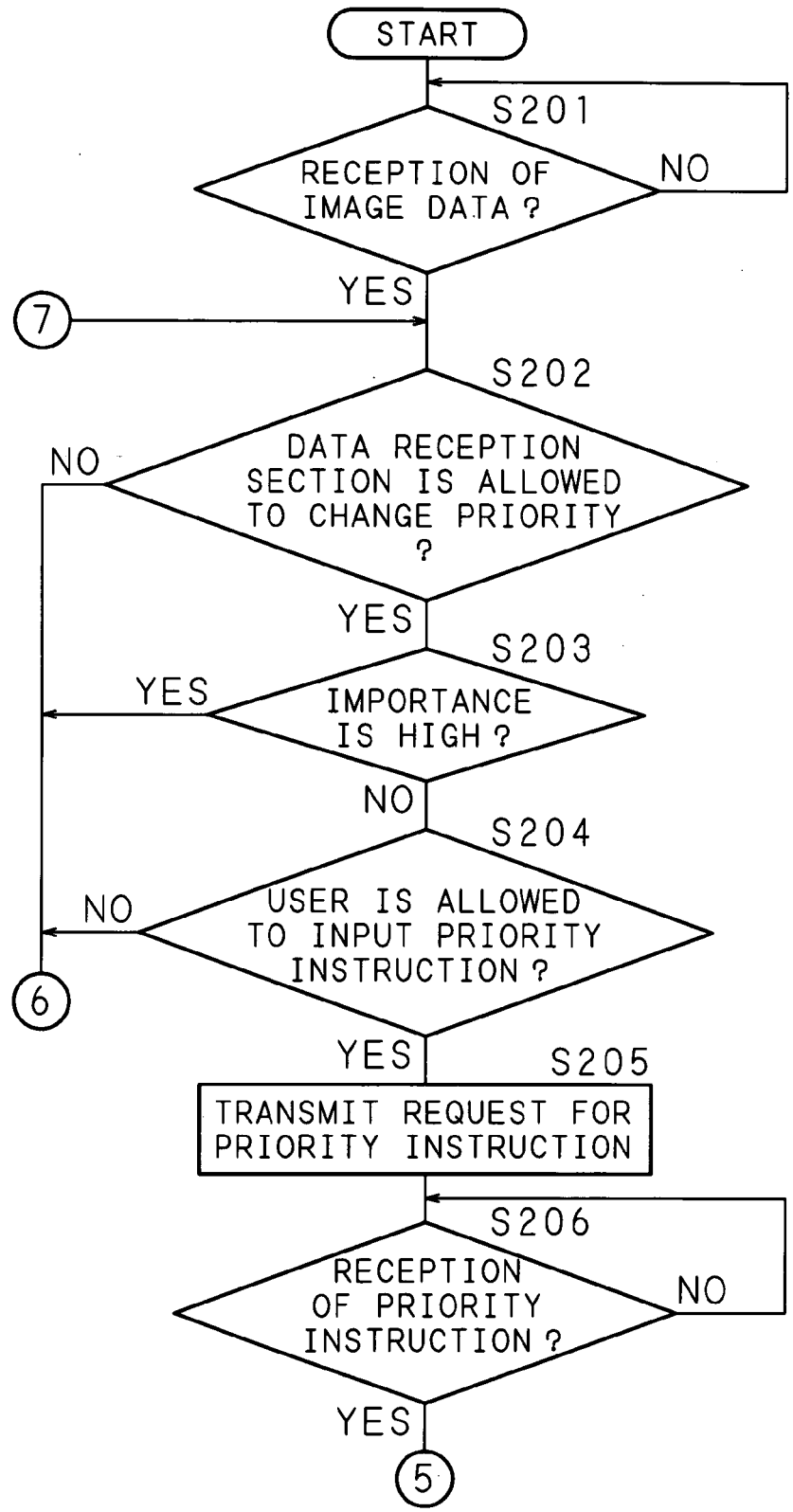
FIG. 6 is a flow chart showing a procedure that the image processing apparatus according to the first embodiment receives image data, and then performs processing.
Figure 7:
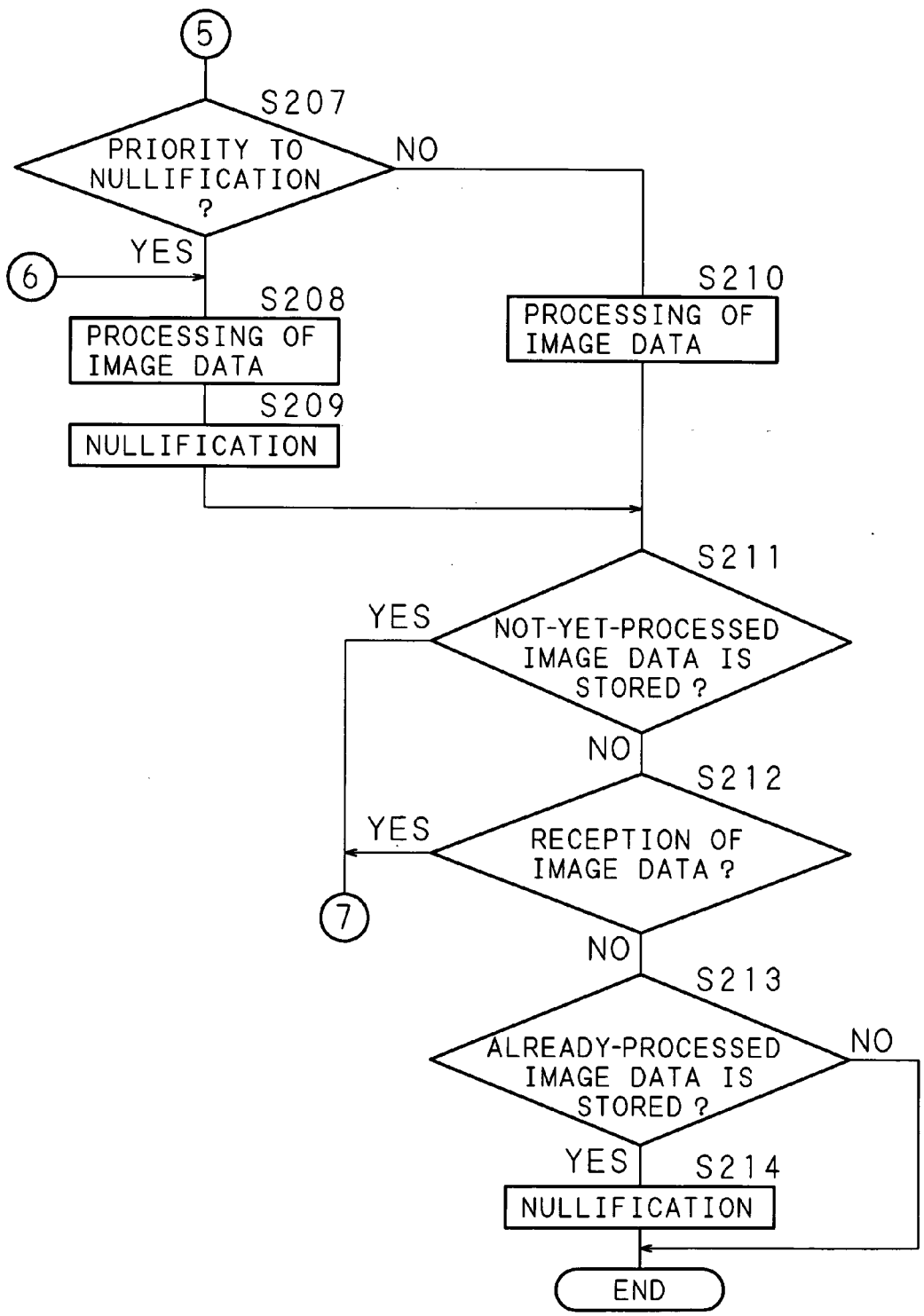
FIG. 7 is a flow chart showing a procedure that the image processing apparatus according to the first embodiment receives image data, and then performs processing.

FIG. 6 and FIG. 7 are flow charts showing the procedure that the image processing apparatus 1 receives image data, and then performs processing. The control section 11 of the image processing apparatus 1 performs the following process according to the control program stored in the ROM 18. The control section 11 of the image processing apparatus 1 monitors the reception of image data in the modem section 151 or the communication section 152 (S201). At that time, an instruction for the image processing is also received simultaneously that specifies the output of the image, or the transmission of the image data to another facsimile machine 3 by facsimile communication, or the like. Further, information indicating the importance of the image data may be received. When no image data is received (S201: NO), the control section 11 continues the monitoring of the reception.

When image data is received (S201: YES), the control section 11 stores the received image data into the storage section 19. Then, depending on which data reception section has received the image data, the control section 11 judges whether the priority to the processing of image data or the nullification of image data is allowed to be changed or not (S202). At that time, the control section 11 refers to the setting information stored in the management section 17. Then, when the data reception section that has received the image data is recorded as a data reception section allowed to change the priority, the control section 11 judges that the changing of the priority is allowed. In the case that the contents of the setting information is as the example of FIG. 2, the changing of the priority is not allowed for the image data received by the modem section 151. However, the changing of the priority is allowed for the image data received by the communication section 152. When it is judged that the changing of the priority is not allowed (S202: NO), the control section 11 advances the process to step S208 so that priority is imparted to the nullification of already-processed image data.

When it is judged that the changing of the priority is allowed (S202: YES), the control section 11 judges whether the importance of the received image data is high or not (S203). At that time, the control section 11 judges the importance of the image data, for example, on the basis of the presence or absence of importance-indicating information received simultaneously with the image data. When the importance of the image data is high (S203: YES), the control section 11 advances the process to step S208 so that priority is imparted to the nullification of already-processed image-data. When the importance of the image data is not high (S203: NO), the control section 11 judges whether the user of the transmission source of the image data is allowed to input a priority instruction or not (S204). At that time, the control section 11 refers to the setting information stored in the management section 17. Then, when the IP address of the PC 2 of the transmission source of the received image data is recorded in the setting information as the identification information for the IP addresses of the PCs 2 used by such users that are allowed to input priority information, it is judged that the user is allowed to input a priority instruction. When the user is not allowed to input a priority instruction (S204: NO), the control section 11 advances the process to step S208 so that priority is imparted to the nullification of already-processed image data. When the user is allowed to input a priority instruction (S204: YES), the control section 11 causes the communication section 152 to transmit a request for a priority instruction for imparting priority either the processing of image data or the nullification of image data, to the PC 2 of the transmission source of the image data (S205). The PC 2 outputs a reception screen for a priority instruction as shown in FIG. 5, and then receives a priority instruction issued by the operation of the user. The received priority instruction is transmitted to the image processing apparatus 1.

Then, the control section 11 monitors the reception of a priority instruction in the communication section 152 (S206). When no priority instruction is received (S206: NO), the control section 11 continues the monitoring of the reception of a priority instruction. When a priority instruction is received (S206: YES), the control section 11 judges whether the imparting of priority to the nullification of image data is instructed or not (S207). When the imparting of priority to the nullification of image data is instructed (S207: YES), the control section 11 performs the processing of image data such as: the formation of an image in the image formation section 161 on the basis of the image data stored in the storage section 19; and the transmission of the image data from the modem section 151 to another facsimile machine 3 (S208). After the processing of image data is completed in step S208, the already-processed image data stored in the storage section 19 is overwritten with meaningless data so that the image data is nullified (S209). Then, the control section 11 advances the process to step S211 described later.

When the imparting of priority to the processing of image data is instructed in step S207 (S207: NO), the control section 11 performs the processing of image data (S210). After step S209 or step S210 is completed, the control section 11 judges whether not-yet-processed image data is stored in the storage section 19 or not (S211). When not-yet-processed image data is stored in the storage section 19 (S211: YES), the control section 11 returns the process to step S202. When not-yet-processed image data is not stored in the storage section 19 (S211: NO), the control section 11 monitors the reception of image data in the modem section 151 or the communication section 152 (S212). When image data is received (S212: YES), the control section 11 returns the process to step S202. When no image data is received (S212: NO), the control section 11 judges whether already-processed image data is stored in the storage section 19 or not (S213). When already-processed image data is not stored in the storage section 19 (S213: NO), the control section 11 terminates the process. When already-processed image data is stored in the storage section 19 (S213: YES), the control section 11 performs the nullification of the already-processed image data stored in the storage section 19 (S214), and then terminates the process.

As described above in detail, according to the first embodiment, in the processing of image data, a priority instruction can be received that instructs which of the processing of image data and the nullification of image data should be provided with priority. Thus, judging the contents of the image data, a user can select the imparting of priority to the processing of image data or the nullification of image data. In case that the confidentiality of the image data is high, priority is imparted to the nullification of image data so that the security level of the information is maintained. In case that the confidentiality of the image data is low, priority is imparted to the processing of image data so that the processing efficiency of the image data is improved. Further, according to the first embodiment, a priority instruction is received before the processing of image data. The specification of the priority is ensured appropriately depending on the contents of the image data. Furthermore, according to the invention, the permission or non-permission to receive a priority instruction is determined depending on the importance of image data. This avoids excessive degradation in the security level of the information in the case of data having high importance.

Further, according to the first embodiment, in case that priority is imparted to the nullification of image data, the nullification of image data is performed at the time that the processing of image data is completed. This avoids unauthorized retrieval of the image data, and hence improves the security level of the information. Further, according to the first embodiment, in case that priority is imparted to the processing of image data, the nullification of image data is performed when the presence of a user is not detected or alternatively when not-yet-processed image data is not present. As such, the nullification of image data is performed in the timing that the processing of image data is not necessary. This improves the processing efficiency of the image data.

In the first embodiment, the image read section 14, the modem section 151, and the communication section 152 have served as a data reception section. However, the image processing apparatus 1 may be further provided with means for receiving image data from an external recording medium such as a memory card.

Second Embodiment

Figure 8:
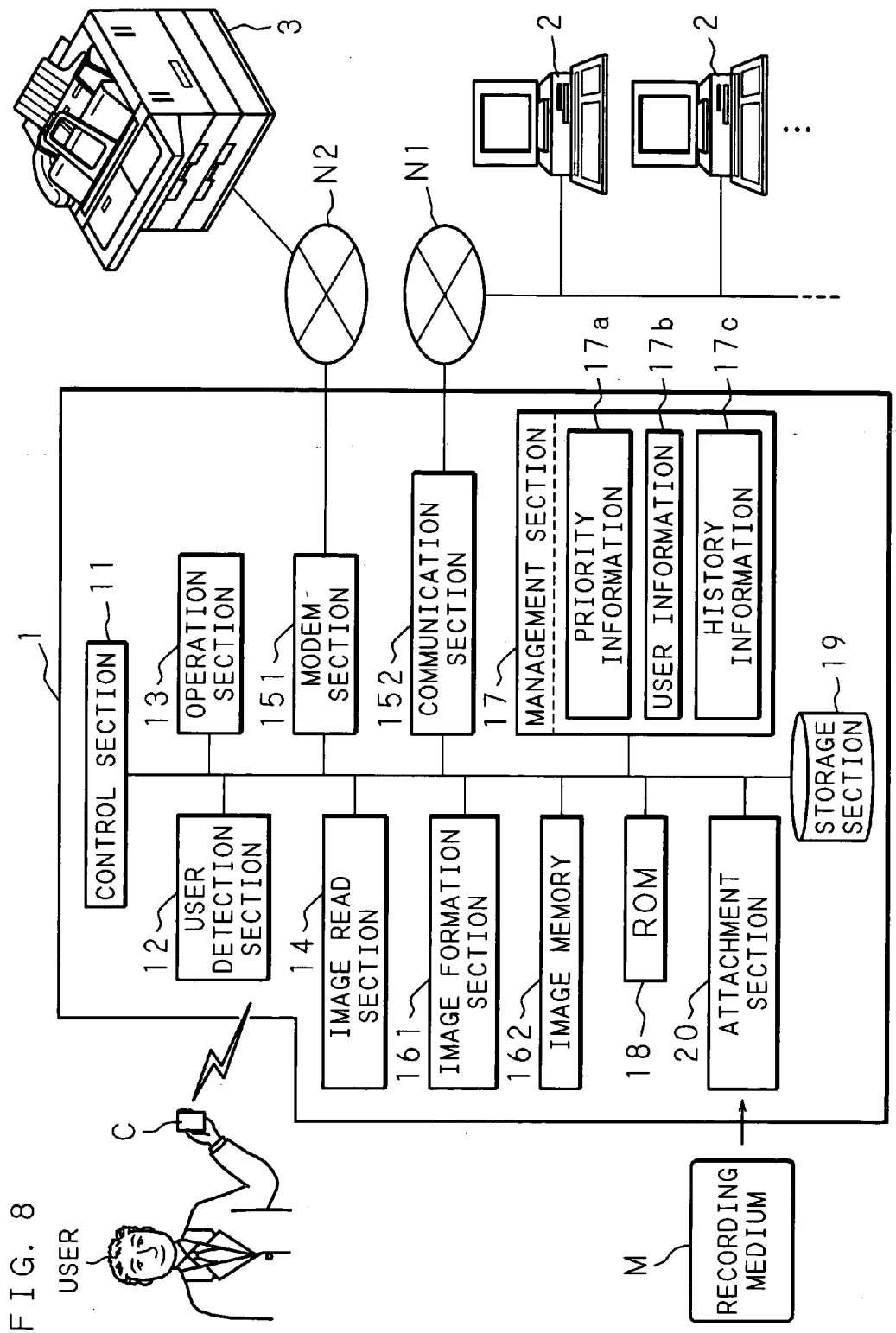
FIG. 8 is a functional block diagram showing the functional configuration of the inside of an image processing apparatus serving as a data processing apparatus according to a second embodiment.

FIG. 8 is a functional block diagram showing the functional configuration of the inside of an image processing apparatus serving as a data processing apparatus according to a second embodiment. In FIG. 8, like portions to FIG. 1 are designated by like numerals. An image processing apparatus 1 according to the second embodiment performs a process of setting up which of the processing of image data and the nullification of image data should be performed with priority, on the basis of its own usage history in the past.

The control section 11 is connected to an attachment section 20 into which a portable recording medium M such as a semiconductor memory card and a magneto-optical disc can be inserted. The attachment section 20 is a reader/writer for the recording medium M, and can read data stored in the recording medium M and write data into the recording medium M. The image processing apparatus 1 can read data from the recording medium M and then output the data through the image formation section 161, the modem section 151, or the communication section 152. Further, the image processing apparatus 1 can write, into the recording medium M, data received through the image read section 14, the modem section 151, or the communication section 152. The storage section 19 stores data having been read from the recording medium M by the attachment section 20, as well as image data generated by the image read section 14 and image data received by the modem section 151 or the communication section 152. As such, the image read section 14, the modem section 151, the communication section 152, and the attachment section 20 serve as a data reception section according to the second embodiment.

In addition to management information for managing the operation of the image processing apparatus 1, the management section 17 stores: priority information 17a for indicating which of the processing of image data and the nullification of image data should be provided with priority; user information 17b for recording the identification information of the uses allowed to use the image processing apparatus 1; and history information 17c for recording a usage history of the image processing apparatus 1. The priority information 17a indicates a result having been set up by the image processing apparatus 1 concerning which of the processing of image data and the nullification of image data should be provided with priority. The user information 17b records identification information for identifying users allowed to use the image processing apparatus 1. This information includes: the ID information stored in the ID card C carried by each user; and the IP address of the PC 2 used by each user. The user information 17b further records information indicating the rank of each user depending on the importance of the data treated by the user, in a manner corresponded to the identification information.

FIG. 9 is a conceptual diagram showing an example of the contents of the history information 17c. This information records: the date and time of the processing of image data; the contents of the processing of image data, such as copy and printer output; the identification information for identifying a user; and the user rank recorded in the user information 17b and corresponded to the identification information. The user rank is defined such that the rank becomes higher for a user who is expected to frequently use the image processing apparatus 1 for the purpose of processing data having high importance. For example, executives having many opportunities to treat confidential information are classified into A. Part-time workers who cannot treat confidential information are classified into C. As such, the user rank is defined depending on the user's role. Further, the history information 17c records priority information indicating which of the processing of image data and the nullification of image data has been performed with priority when the image data is processed. As such, the management section 17 serves as a history storage section according to the second embodiment.

Next, the process performed by the image processing apparatus 1 serving as a data processing apparatus according to the second embodiment is described below with reference to flow charts. In the initial stage, for example, immediately after the installation of the image processing apparatus 1, a priority instruction for instructing which of the processing of image data and the nullification of image should be provided with priority is received from a user before the processing of the image data, so that the setting up is performed such that priority is imparted to either the processing of image data or the nullification of image data depending on the received priority instruction. At each time of processing of image data, the image processing apparatus 1 records a usage history into the history information 17c. When a predetermined period such as one month has elapsed since the operation was started and when a sufficient usage history has been accumulated, the image processing apparatus 1 sets up that priority should be imparted to either the processing of image data or the nullification of image data, depending on the contents of the accumulated usage history.

Figure 10:
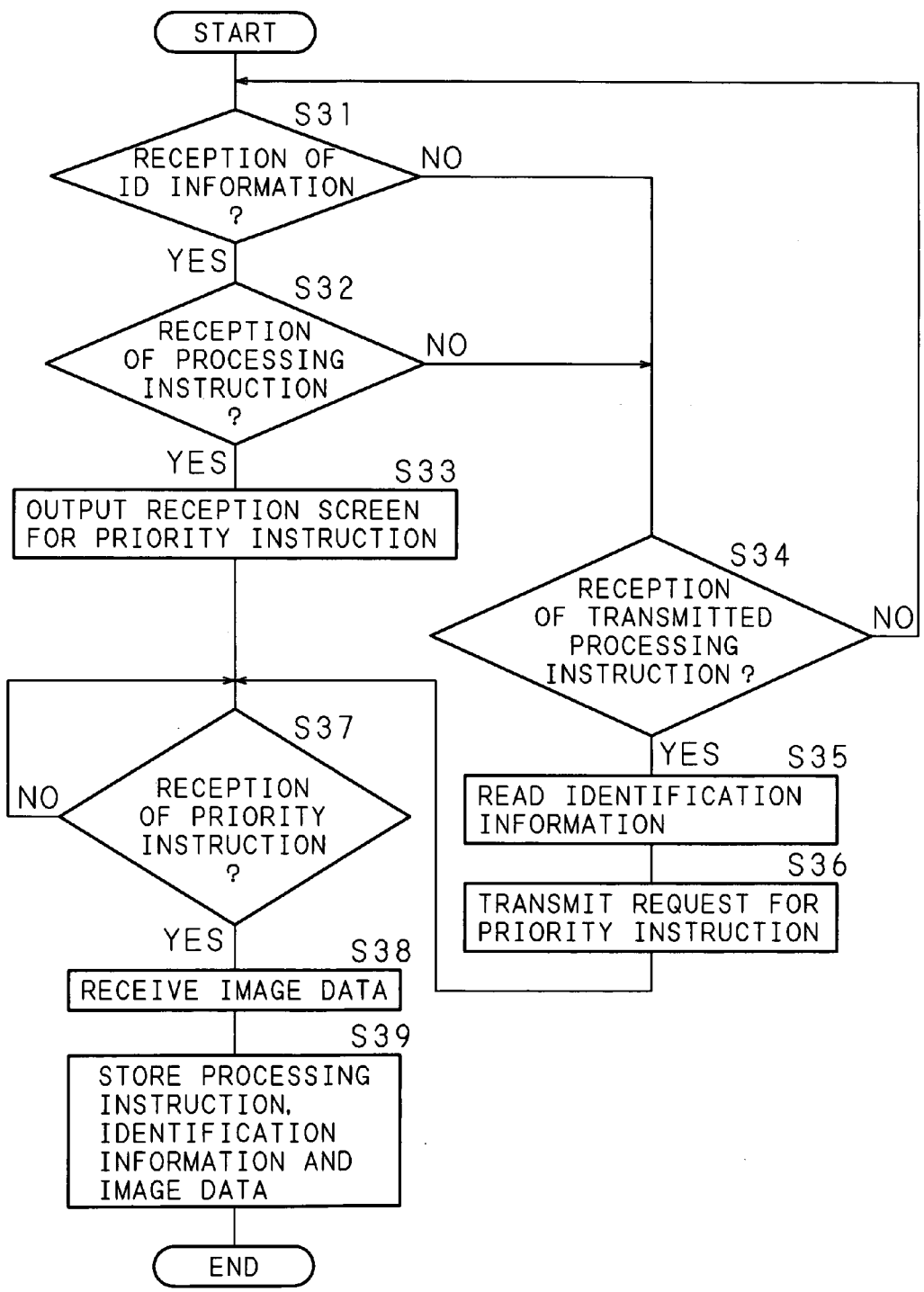
FIG. 10 is a flow chart showing a procedure of the process that in a stage that a sufficient usage history is not yet accumulated, the image processing apparatus according to the second embodiment receives image data.

FIG. 10 is a flow chart showing the procedure of the process that in a stage that a sufficient usage history is not yet accumulated, the image processing apparatus 1 receives image data. The control section 11 of the image processing apparatus 1 performs the following process according to the control program stored in the ROM 18.

The control section 11 of the image processing apparatus 1 monitors the communication of the user detection section 12 with the ID card C carried by a user staying in the vicinity of the image processing apparatus 1, and thereby monitors that the user detection section 12 receives the ID information stored in the ID card C (S31). When the user detection section 12 receives ID information (S31: YES), the control section 11 monitors the reception of a processing instruction for image data issued by the user operating the operation section 13 (S32). At that time, a processing instruction is received that includes: an instruction concerning the reception of the image data and specifying either that an image is to be read by the image read section 14 or that image data stored in the recording medium M is to be read by the attachment section 20; and an instruction concerning the image processing and specifying that the image is to be copied, or that the image data is to be transmitted to another facsimile machine 3 by facsimile communication, or that the image data is to be written into the recording medium M, or that the image data is to be transmitted to the PC 2. When the processing instruction for the image data is received (S32: YES), the control section 11 outputs a reception screen for receiving a priority instruction for instructing which of the processing of image data and the nullification of image data should be provided with priority, on the displaying means such as a touch panel of the operation section 13 (S33) (see FIG. 5).

In the reception screen shown in FIG. 5, one of the selection buttons is selected in the operation of the user, and then O.K. is specified. As a result, the operation section 13 receives a priority instruction specifying which of the processing of image data and the nullification of image data should be provided with priority.

When no ID information is received in the user detection section 12 (S31: NO) or alternatively when no processing instruction for the image data is received (S32: NO), the control section 11 monitors that the communication section 152 receives a processing instruction for the image data transmitted from the PC 2 operated by the user (S34). At that time, a processing instruction is received that specifies that an image is to be outputted, or that the image data is to be transmitted to another facsimile machine 3 by facsimile communication, or that the image data is to be written into the recording medium M. When no processing instruction is received (S34: NO), the control section 11 returns the process to step S31. When the communication section 152 receives a processing instruction for the image data (S34: YES), the control section 11 reads information such as the IP address indicating the PC 2 of the transmission source of the processing instruction, as the identification information for identifying the user (S35). Then, the control section 11 causes the communication section 152 to transmit a request for a priority instruction for specifying which of the processing of image data and the nullification of image data should be provided with priority, to the PC 2 of the transmission source of the image data (S36). The PC 2 outputs a reception screen for a priority instruction as shown in FIG. 5, and then receives a priority instruction issued by the operation of the user. The received priority instruction is transmitted to the image processing apparatus 1.

After step S33 or step S36 is completed, the control section 11 monitors either that the operation section 13 receives a priority instruction issued by the operation of the user, or that the communication section 152 receives a priority instruction (S37). When no priority instruction is received (S37: NO), the control section 11 continues the monitoring of the reception of a priority instruction. When a priority instruction is received (S37: YES), image data is read from a manuscript image by the image read section 14, or image data is read from the recording medium M by the attachment section 20, or image data is received by the communication section 152, so that any image data is received (S38). Then, the control section 11 causes the storage section 19 to store: the processing instruction for the image data including the priority instruction; the identification information; and the image data of the processing object; which have been received in the above-mentioned process (S39), and then terminates the process. After the process of receiving the image data is completed, the control section 11 starts the process of step S31.

Figure 11:
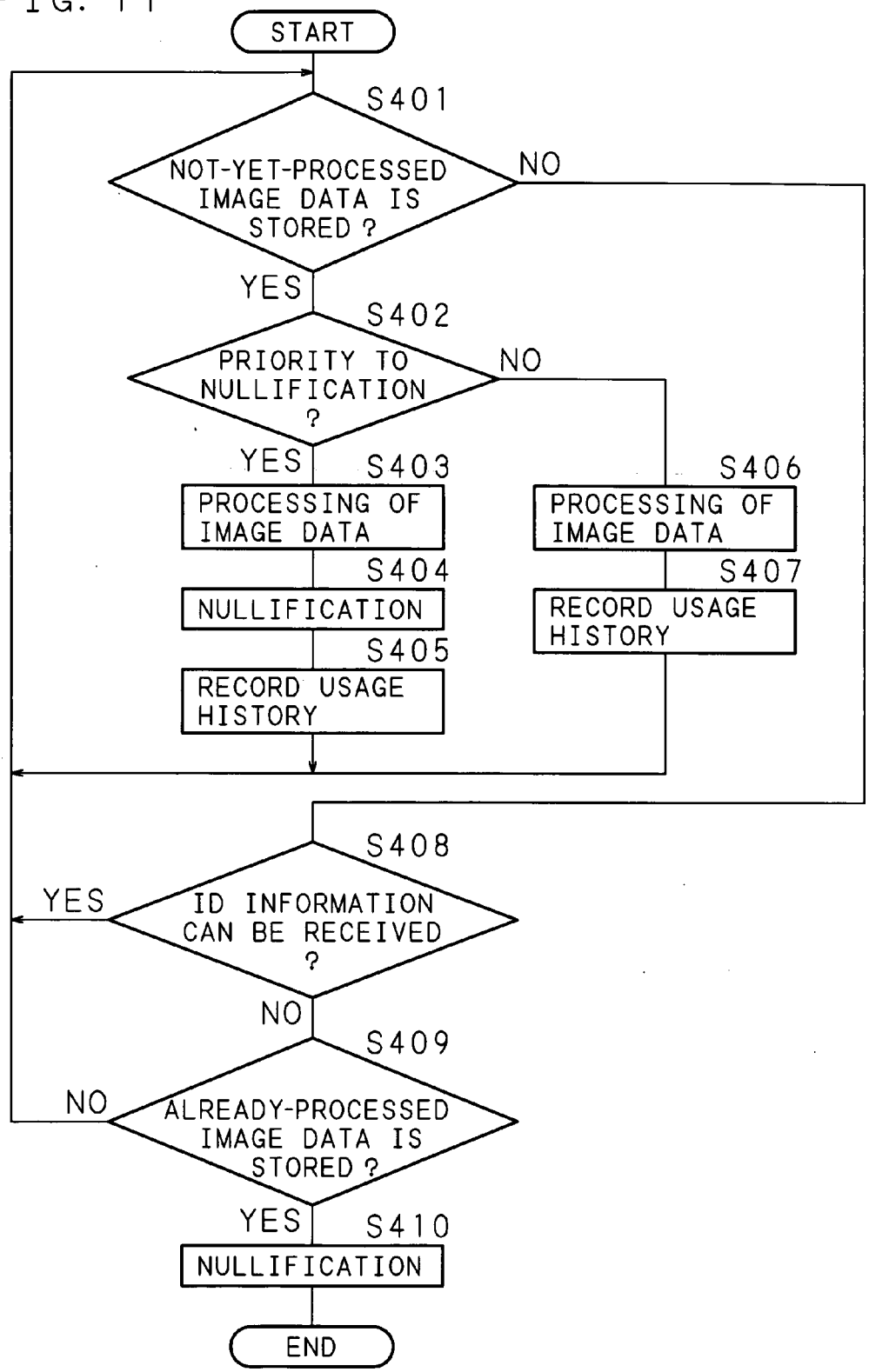
FIG. 11 is a flow chart showing a procedure of image data processing performed by the image processing apparatus according to the second embodiment.

In parallel to the process of receiving the image data, the image processing apparatus 1 performs the processing of the image data stored in the storage section 19. FIG. 11 is a flow chart showing the procedure of image data processing performed by the image processing apparatus 1. The control section 11 of the image processing apparatus 1 performs the following process according to the control program stored in the ROM 18.

The control section 11 judges whether not-yet-processed image data is stored or not in the storage section 19 together with a processing instruction and identification information of the image data (S401). When not-yet-processed image data is stored in the storage section 19 (S401: YES), the control section 11 judges whether the priority instruction included in the processing instruction for the image data specifies the imparting of priority to the nullification of image data or not (S402). When priority specifies the imparting of priority to the nullification of image data (S402: YES), the control section 11 performs the processing of image data such as the formation of an image by the image formation section 161 on the basis of the image data stored in the storage section 19, the transmission of the image data from the modem section 151 to another facsimile machine 3, the write of the image data into the recording medium M by the attachment section 20, and the transmission of the image data from the communication section 152 to the PC 2 (S403). After the processing of image data in step S403 is completed, already-processed image data stored in the storage section 19 is overwritten with meaningless data so that the image data is nullified (S404). Alternatively, the image data may be deleted in the storage section 19 so that the image data may be nullified. Then, the control section 11 records a usage history including the date and time of processing of image data and the priority information as shown in FIG. 9 into the history information 17c (S405), and then returns the process to step S401.

When the priority instruction included in the processing instruction for the image data in step S402 specifies the imparting of priority to the processing of image data (S402: NO), the control section 11 performs the processing of image data (S406), and does not perform the nullification of image data. Then, the control section 11 records the usage history into the history information 17c (S407), and then returns the process to step S401.

When not-yet-processed image data is not stored in the storage section 19 in step S401 (S401: NO), the control section 11 judges whether the user detection section 12 can receive the user ID information from the ID card C or not (S408). When the user detection section 12 can receive the ID information (S408: YES), the control section 11 returns the process to step S401. When the user detection section 12 cannot receive the ID information (S408: NO), this indicates that no user stays in the vicinity of the image processing apparatus 1, and accordingly the control section 11 judges whether already-processed image data is stored in the storage section 19 or not (S409). When already-processed image data is not stored in the storage section 19 (S409: NO), the control section 11 returns the process to step S401. When already-processed image data is stored in the storage section 19 (S409: YES), the control section 11 performs the nullification of the already-processed image data stored in the storage section 19 (S410), and then terminates the process. After the processing of image data is completed, the control section 11 starts the process of step S401.

Figure 12:
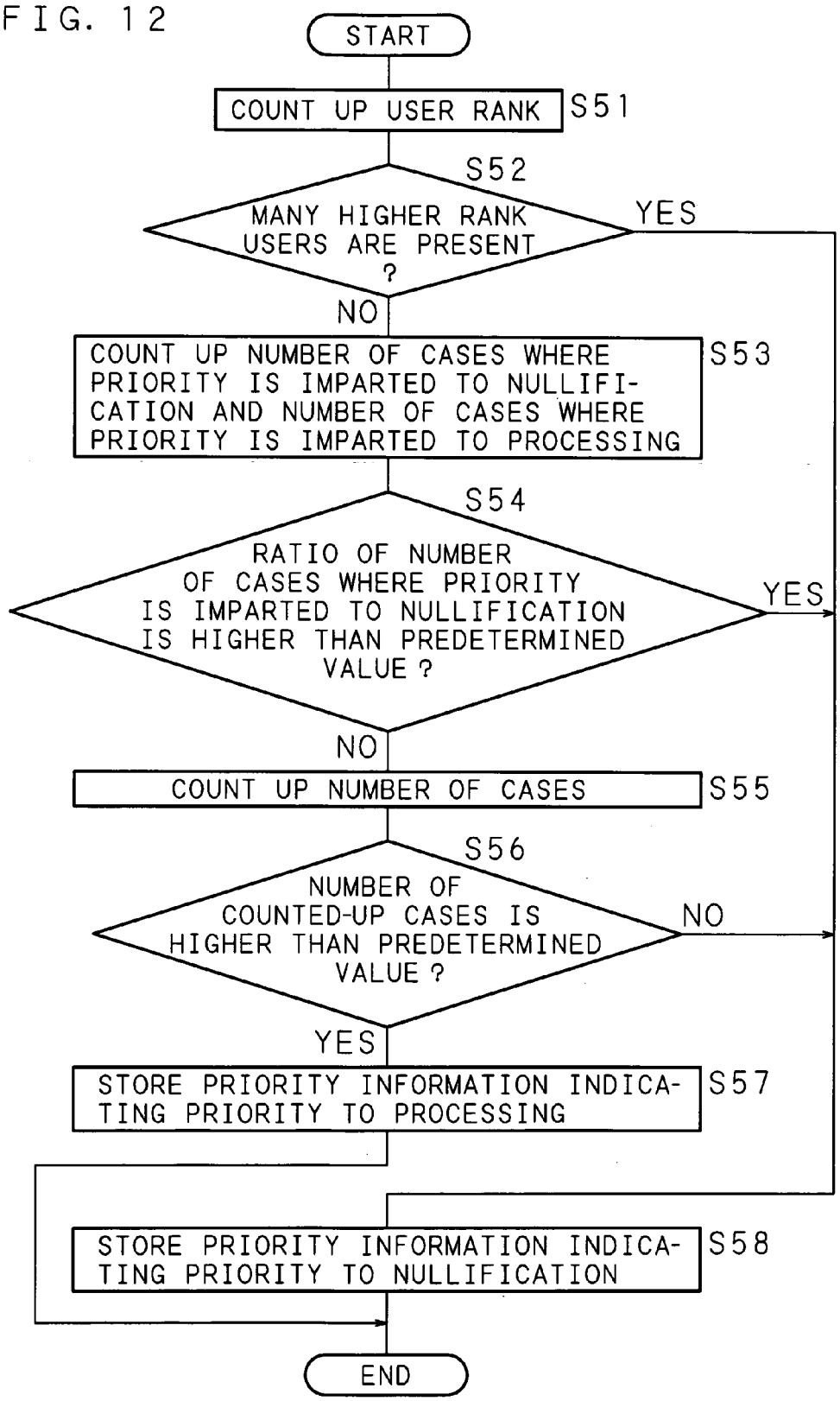
FIG. 12 is a flow chart showing a procedure of the process performed by the image processing apparatus according to the second embodiment in order to set up which of the processing of image data and the nullification of image data should be provided with priority.

When a predetermined period such as one month has elapsed since the operation was started and when a sufficient usage history has been accumulated, the image processing apparatus 1 sets up that priority should be imparted to either the processing of image data or the nullification of image data, depending on the contents of the accumulated usage history. FIG. 12 is a flow chart showing the procedure of the process performed by the image processing apparatus 1 in order to set up which of the processing of image data and the nullification of image data should be provided with priority. The control section 11 of the image processing apparatus 1 performs the following process according to the control program stored in the ROM 18.

When a predetermined period has passed since the usage history begins to be accumulated, the control section 11 counts up the user rank included in the history information 17c stored in the management section 17 (S51), and thereby judges whether the ratio of the usage by higher rank users is higher than a predetermined value or not (S52). When the ratio of the usage by higher rank users is higher than the predetermined value (S52: YES), it is judged that the treated image data includes confidential information at a high possibility. Thus, in order to improve the security, the control section 11 causes the management section 17 to store the priority information 17a indicating the imparting of priority to the nullification of image data (S58), and then terminates the process.

When the ratio of the usage by higher rank users is below the predetermined value (S52: NO), the control section 11 counts up the number of cases where priority is imparted to the nullification of image data and the number of cases where priority is imparted to the processing of image data, which are included in the history information 17c (S53). Then, the control section 11 judges whether the ratio of the number of cases where priority is imparted to the nullification of image data relative to the number of total cases contained in the history information 17c is higher than a predetermined value or not (S54). When the ratio of the number of cases where priority is imparted to the nullification of image data is higher than the predetermined value (S54: YES), the control section 11 causes the management section 17 to store the priority information 17a indicating the imparting of priority to the nullification of image data (S58), and then terminates the process.

When the ratio of the number of cases where priority is imparted to the nullification of image data is below the predetermined value in step S54 (S54: NO), the control section 11 counts up the number of cases of the usage history included in the history information 17c (S55), and judges whether the number of counted-up cases is higher than a predetermined value or not (S56). When the number of counted-up cases is higher than the predetermined value (S56: YES), the control section 11 causes the management section 17 to store the priority information 17a indicating the imparting of priority to the processing of image data so that the processing of image data can be performed efficiently (S37), and then terminates the process. Alternatively, in step S55, the number of processing instructions received per unit time may be counted up. Then, in step S56, priority may be imparted to either the processing of image data or the nullification of image data depending on the number of processing cases per unit time. When the number of counted-up cases is below the predetermined value (S56: NO), the control section 11 causes the management section 17 to store the priority information 17a indicating the imparting of priority to the nullification of image data (S58), and then terminates the process. The process of setting up that priority should be imparted to either the processing of image data and the nullification of image data may be performed merely once when a predetermined period has elapsed after the operation of the image processing apparatus 1 is started. Alternatively, the setting up process may be performed periodically every month or the like using the usage history of the latest predetermined period.

After the setting up of which of the processing of image data and the nullification of image data should be provided with priority, the image processing apparatus 1 performs processing depending on the setting result. FIG. 13 is a flow chart showing the procedure of the process performed by the image processing apparatus 1 after the setting up of which of the processing of image data and the nullification of image data should be provided with priority. The control section 11 of the image processing apparatus 1 performs the following process according to the control program stored in the ROM 18.

The control section 11 of the image processing apparatus 1 monitors the communication of the user detection section 12 with the ID card C carried by a user staying in the vicinity of the image processing apparatus 1, and thereby monitors that the user detection section 12 receives the ID information stored in the ID card C (S601). When the user detection section 12 receives ID information (S601: YES), the control section 11 monitors the reception of a processing instruction for image data issued by the user operating the operation section 13 (S602). When a processing instruction for the image data is received (S602: YES), the control section 11 monitors the reception of a request for a reception screen for a priority instruction that is issued by the user operating the operation section 13 and that instructs which of the processing of image data and the nullification of image data should be provided with priority (S603).

When no ID information is received in the user detection section 12 (S601: NO) or alternatively when no processing instruction for the image data is received (S602: NO), the control section 11 monitors that the communication section 152 receives a processing instruction for the image data transmitted from the PC 2 operated by the user (S604). When no processing instruction for the image data is received (S604: NO), the control section 11 returns the process to step S601. When the communication section 152 receives a processing instruction for the image data (S604: YES), the control section 11 reads information such as the IP address indicating the PC 2 of the transmission source of the processing instruction, as identification information for identifying the user (S605). Then, the control section 11 monitors that the communication section 152 receives a priority instruction transmitted from the PC 2 and indicating which of the processing of image data and the nullification of image data should be provided with priority (S606).

When no request for a reception screen for a priority instruction is received (S603: NO) or when no priority instruction is received (S606: NO), the control section 11 receives image data by reading a manuscript image through the image read section 14, or by reading image data from the recording medium M through the attachment section 20, or by receiving image data through the communication section 152 (S607). Then, the control section 11 reads the priority information 17*a* stored in the management section 17 (S608), and then displays the information on the displaying means of the operation section 13 or alternatively transmits the information to the PC 2 through the communication section 152 so as to output the contents of the priority information 17*a* indicating which of the processing of image data and the nullification of image data should be provided with priority (S609). Then, the control section 11 causes the storage section 19 to store: the processing instruction for the image data including the priority instruction for instructing which of the processing of image data and the nullification of image data should be provided with priority in correspondence to the contents of the priority information 17*a*; the identification information; and the image data of the processing object (S610), and then terminates the process. After the process of receiving the image data is completed, the control section 11 starts the process of step S601.

When a request for a reception screen for a priority instruction is received (S603: YES), the control section 11 outputs a reception screen for a priority instruction as shown in FIG. 5 to the displaying means such as a touch panel of the operation section 13 (S611), and then monitors that the operation section 13 receives a priority instruction issued by the operation of the user (S612). When no priority instruction is received (S612: NO), the control section 11 continues the monitoring of the reception of a priority instruction.

When a priority instruction is received (S612: YES) or alternatively when a priority instruction is received (S606: YES), the control section 11 receives image data by reading a manuscript image through the image read section 14, or by reading image data from the recording medium M through the attachment section 20, or by receiving image data through the communication section 152 (S613). Then, the control section 11 causes the storage section 19 to store: the processing instruction for the image data including the received priority instruction; the identification information; and the image data of the processing object (S610), and then terminates the process. After the process of receiving the image data is completed, the control section 11 starts the process of step S601.

The procedure of image data processing performed by the image processing apparatus 1 in parallel to the process of receiving the image data is the same as that shown in FIG. 11. In the above-mentioned process, which of the processing of image data and the nullification of image data should be provided with priority has been set up in advance and stored into the priority information 17*a*. Alternatively, at each time of receiving the image data, which of the processing of image data and the nullification of image data should be provided with priority may be set up depending on the usage history. In this case, when the image data is received, the image processing apparatus 1 performs a combination of the processing shown in FIG. 12 and the processing shown in FIG. 13.

As described above in detail, in the processing of image data, the image processing apparatus 1 for processing image data and then nullifying already-processed image data according to the second embodiment stores a usage history and thereby sets up that priority should be imparted to either the processing of image data or the nullification of image data, depending on the contents of the usage history. For example, a priority instruction is received that instructs which of the processing of image data and the nullification of image data should be provided with priority. Then, which of the processing of image data and the nullification of image data is performed with priority is stored as a usage history, so that priority is imparted to the nullification of image data when the usage history indicates a large number of times of imparting of priority to the nullification of image data. As such, the setting up of which of the processing of image data and the nullification of image data should be provided with priority is performed depending on the result of comparison between the numbers of times of priorities. This allows the image processing apparatus 1 to achieve appropriate capability depending on the environment where the image processing apparatus 1 is used, that is, depending on a processing-speed oriented operation or a security oriented operation.

In the second embodiment, the setting up of which of the processing of image data and the nullification of image data should be provided with priority is performed depending on the throughput of the image data contained in the usage history. Thus, for example, in case that there is a high throughput of image data so that the processing can stagnate, a processing-speed oriented operation is adopted. On the contrary, when there is a low throughput of image data so that the processing can not stagnate even when priority is imparted to the nullification of image data, security oriented operation is adopted. As such, the processing speed and the security level can be traded off with each other depending on the throughput of the data.

In the second embodiment, the setting up of which of the processing of image data and the nullification of image data should be provided with priority is performed depending on the contents of the user identification information contained in the usage history. Thus, for example, priority is imparted to the nullification of data when many executives having many opportunities to treat confidential information are using the apparatus. As such, the image processing apparatus 1 achieves appropriate capability depending on the class of users.

In the second embodiment, the setting up of which of the processing of image data and the nullification of image data should be provided with priority is performed depending on the usage history stored within a predetermined past period such as one month after the operation of the image processing apparatus 1 was started. This allows the image processing apparatus 1 to achieve appropriate capability depending on the general operating environment.

In the second embodiment, the setting result of which of the processing of image data and the nullification of image data to impart priority should be provided with priority is outputted. This allows the user to check the operating environment of the image processing apparatus 1. The image processing apparatus 1 has been described for the case that the setting result is outputted to the displaying means of the operation section 13. However, the setting result may be transmitted from the communication section 152 to a manager by e-mail. As for the setting up of which of the processing of image data and the nullification of image data should be provided with priority, the same setting result has been adopted for all users. However, the invention is not limited to this. A usage history for each user may be recorded in a manner corresponded to the identification information for identifying the user. Then, the setting up of which of the processing of image data and the nullification of image data should be provided with priority may be performed for each user. This allows each user to finely adjust appropriate operation of the image processing apparatus 1 depending on the environment of the user.

In the first embodiment and the second embodiment, the image processing apparatus 1 has been a composite machine provided with a plurality of functions of a facsimile machine, a printer, and the like. However, the invention is not limited to this. Another apparatus may be used that has solely the function of a single-function machine such as a facsimile machine, a copying machine, and a printer. The data processing apparatus according to the invention has been described for the case of an image processing apparatus 1. However, the invention is not limited to this. Another apparatus may be used that processes non-image data such as text data.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A data processing apparatus comprising:
a data reception section for receiving data;
a data storage section for storing the data received by said data reception section;
a processing section for processing the data stored in said data storage section;
a nullification section for nullifying the data stored in said data storage section;
a history storage section for storing a usage history;
a setting section for setting up that prority should be imparted to either the processing to be performed by said processing section onto not-yet-processed data or the nullification to be performed by said nullification section onto already-processed data depending on the contents of the usage history stored in said history storage section;
an execution section for performing with priority either the processing of not-yet-processed data or the nullification of already-processed data, depending on the setting result of said setting section;
a priority instruction reception section for receiving a priority instruction for imparting priority to either the processing of not-yet-processed data or the nullification of already-processed data,
wherein, in response to the priority instruction received by said priority instruction reception section, said execution section performs with priority either the processing of not-yet-processed data or the nullification of already-processed data;
wherein said history storage section stores, as a usage history, which of the processing of not-yet-processed data and the nullification of already-processed data has been performed with priority in response to the priority instruction; and
wherein, depending on a result of comparison between the number of times of imparting priority to the nullification of already-processed data and the number of times of imparting priority to the processing of not-yet-processed data which are stored as the usage history, said setting section sets up that priority should be imparted to either the processing of not-yet-processed data or the nullification of already-processed data.

2. A data processing apparatus comprising:
a data reception section for receiving data;
a data storage section for storing the data received by said data reception section;
a processing section for processing the data stored in said data storage section
a nullification section for nullifying the data stored in said data storage section;
a history storage section for storing a usage history;
a setting section for setting up that priority should be imparted to either the processing to be performed by said processing section onto not-yet-processed data or the nullification to be performed by said nullification section onto already-processed data, depending on the contents of the usage history stored in said history storage section;

an execution section for performing with priority either the processing of not-yet-processed data or the nullification of already-processed data, depending on the setting result of said setting section;

an identification information reception section for receiving identification information of a user classified into a plurality of classes, wherein said history storage section stores as a usage history the identification information received by said identification information reception section; and wherein, depending on the frequency of each class of the identification information stored as the usage history, said setting section sets up that priority should be imparted to either the processing of not-yet-processed data or the nullification of already-processed data.

3. A data processing apparatus comprising:

a data reception section for receiving data;

a data storage section for storing the data received by said data reception section;

a processing section for processing the data stored in said storage section;

a nullification section for nullifying the data stored in said data storage section;

a history storage section for storing a usage history;

a setting section for setting up that priority should be imparted to either the processing to be performed by said processing section onto not-yet-processed data or the nullification to be performed by said nullification section onto already-processed data, depending on the contents of the usage history stored in said history storage section;

an execution section for performing with priority either the processing of not-yet-processed data or the nullification of already-processed data, depending on the setting result of said setting section; and an identification information reception section for receiving identification information of a user;

wherein said history storage section stores a usage history in a manner corresponded to each of the identification information received by said identification information reception section; and wherein, depending on the usage history stored in said history storage section in a manner corresponded to each of the identification information received by said identification information reception section, said setting section sets up that priority should be imparted to either the processing of not-yet-processed data or the nullification of already-processed data.

* * * * *